United States Patent
Jiang et al.

(10) Patent No.: US 9,617,100 B2
(45) Date of Patent: Apr. 11, 2017

(54) SHEET MEDIUM STACKING CONVEYING DEVICE AND METHOD (71) Applicant: SHANDONG NEW BEIYANG INFORMATION TECHNOLOGY CO., LTD, Weihai (CN)

(72) Inventors: Tianxin Jiang, Weihai (CN); Jing Zhao, Weihai (CN); Yong Yuan, Weihai (CN); Zhenxing Zhao, Weihai (CN); Jiansheng Liu, Weihai (CN)

(73) Assignee: SHANDONG NEW BEIYANG INFORMATION TECHNOLOGY CO., LTD, Weihai (CN)

( * ) Notice: Subject to any disclaimer, the term of this patent is extended or adjusted under 35 U.S.C. 154(b) by 0 days.

(21) Appl. No.: 14/646,625

(22) PCT Filed: Nov. 20, 2013

(86) PCT No.: PCT/CN2013/087541
§ 371 (c)(1),
(2) Date: May 21, 2015

(87) PCT Pub. No.: WO2014/079368
PCT Pub. Date: May 30, 2014

(65) Prior Publication Data
US 2015/0298925 A1 Oct. 22, 2015

(30) Foreign Application Priority Data
Nov. 22, 2012 (CN) .......................... 2012 1 0478906

(51) Int. Cl.
*B65H 31/30* (2006.01)
*B65H 5/02* (2006.01)
(Continued)

(52) U.S. Cl.
CPC ............... *B65H 9/12* (2013.01); *B65G 47/82* (2013.01); *B65G 57/03* (2013.01); *B65H 5/023* (2013.01);
(Continued)

(58) Field of Classification Search
CPC ............ G07D 11/0018; B65H 31/3045; B65H 31/3027; B65H 31/3036; B65H 2701/1912; B65H 29/12; B65H 29/14; B65H 5/023
See application file for complete search history.

(56) References Cited

U.S. PATENT DOCUMENTS 6,231,299 B1   5/2001 Newsome et al.
7,758,045 B2 *  7/2010 Ko ......................... B65H 29/40
                                                    271/315
(Continued)

FOREIGN PATENT DOCUMENTS

CN    101389556 A    3/2009
CN    102583089 A    7/2012
(Continued)

OTHER PUBLICATIONS

International Search Report for counterpart PCT Application No. PCT/CN2013/087541, dated Feb. 27, 2014 (8 pgs.).

*Primary Examiner* — Luis A Gonzalez
(74) *Attorney, Agent, or Firm* — Shumaker & Sieffert, P.A.

(57) ABSTRACT

A sheet medium stacking conveying device and method, wherein the method comprises a medium conveying step, the medium conveying step comprises: moving a stacking mechanism for clamping media from a medium inlet to a medium outlet along a moving path, and discharging the media clamped by the stacking mechanism towards the medium outlet relative to the stacking mechanism in a process of moving the stacking mechanism towards the (Continued)

medium outlet. The stacking mechanism of the conveying device can reciprocally move between a collection position and discharge position of the media under the driving of a driving mechanism, and the media can be discharged under the condition of no additional power source.

17 Claims, 7 Drawing Sheets (51) Int. Cl.
  *B65H 9/12* (2006.01)
  *B65H 29/12* (2006.01)
  *B65H 29/14* (2006.01)
  *G07D 11/00* (2006.01)
  *B65G 47/82* (2006.01)
  *B65G 57/03* (2006.01)
  *B65H 29/00* (2006.01)
(52) U.S. Cl.
  CPC .......... *B65H 29/003* (2013.01); *B65H 29/12* (2013.01); *B65H 29/14* (2013.01); *B65H 31/3027* (2013.01); *B65H 31/3045* (2013.01); *G07D 11/0018* (2013.01); *B65G 2201/0288* (2013.01); *B65H 2301/4223* (2013.01); *B65H 2403/532* (2013.01); *B65H 2701/1912* (2013.01)

(56) References Cited

U.S. PATENT DOCUMENTS

| 8,047,428 B2 * | 11/2011 | Kong | B65H 31/3009 |
| | | | 235/375 |
| 8,261,903 B2 * | 9/2012 | Deas | B65H 31/3063 |
| | | | 194/344 |
| 8,366,107 B2 * | 2/2013 | Deas | B65H 31/3027 |
| | | | 221/1 |
| 8,814,041 B2 * | 8/2014 | Cha | G07D 11/0018 |
| | | | 235/379 |
| 8,912,479 B2 * | 12/2014 | Milne | B65H 31/3063 |
| | | | 250/221 |
| 2003/0080500 A1 | 5/2003 | Vedoy | |

FOREIGN PATENT DOCUMENTS

| JP | 2001328761 A | 11/2001 | |
| JP | WO 2013061457 A1 * | 5/2013 | ............... B65H 1/26 |

* cited by examiner

SHEET MEDIUM STACKING CONVEYING DEVICE AND METHOD

This application is a national stage entry under 35 U.S.C. §371 of International Application No. PCT/CN2013/087541, filed Nov. 20, 2013, which claims the benefit of CN Application 201210478906.5, filed Nov. 22, 2012. The entire contents of International Application No. PCT/CN2013/087541 and CN Application 201210478906.5 are incorporated herein by reference.

TECHNICAL FIELD

The disclosure relates to a sheet medium stacking conveying device and method.

BACKGROUND

Common sheet media include train tickets, plane tickets, checks, banknotes and the like. Along with the popularization of self service, more and more industries and fields require an automatic treatment, such as stacking, issuing and recycling, on the sheet media (hereinafter referred to as media) For example, a cash dispensing mechanism of a financial system can realize the stacking, conveying and recycling of banknotes; and a ticket issuing device of a railway system can realize the stacking, conveying and recycling of tickets. A conventional sheet medium treatment device is complex in structure and high in cost, and has a plurality of assemblies.

Figure 1:
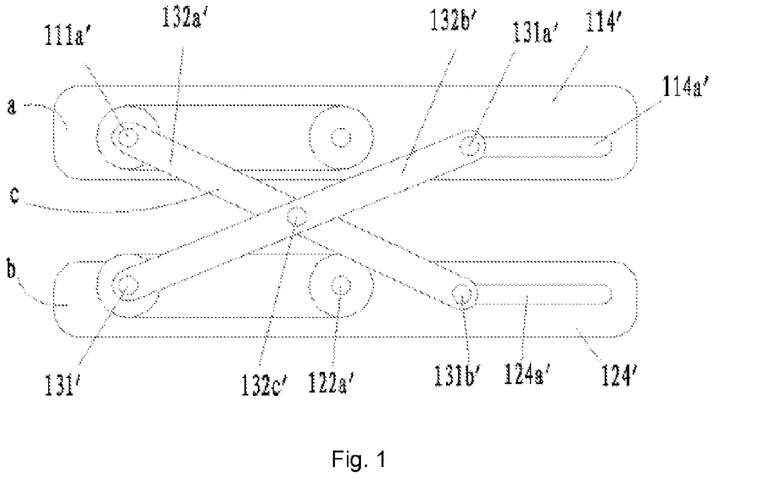
FIG. 1 is a structure view of a sheet medium stacking conveying device in the prior art.

In order to solve the problem, Chinese patent application No. CN201110004944.2 discloses a sheet medium treatment device. As shown in FIG. 1, the sheet medium treatment device includes an upper stacking assembly a, a lower stacking assembly b, and a connecting rod assembly c, wherein a belt conveying mechanism is arranged on each of the upper stacking assembly a and the lower stacking assembly b, and under the action of the connecting rod assembly c, the upper stacking assembly a can move in parallel with the lower stacking assembly b, and contacts with or is separated from the lower stacking assembly b.

When the upper stacking assembly a is separated from the lower stacking assembly b, medium can be stacked between the upper stacking assembly a and the lower stacking assembly b. After the media are collected, a belt of the upper stacking assembly and a belt of the lower stacking assembly tightly clamp the stacked media, and a driving mechanism (not shown in FIG. 1) drives the belts to move to discharge the media stacked between the upper stacking assembly and the lower stacking assembly. However, a conveying distance of the sheet medium treatment device is limited, and a stacking conveying requirement of the media with a longer distance between a collection position and a discharge position cannot be met, so that the adaptability is poor.

SUMMARY

A purpose of the disclosure is to provide a sheet medium stacking conveying device and method, so as to meet a stacking conveying requirement of media with a longer distance between a collection position and a discharge position.

To this end, according to one aspect of the disclosure, a sheet medium stacking conveying method is provided, which includes a medium conveying step, wherein the medium conveying step includes: moving a stacking mechanism for clamping media from a medium inlet to a medium outlet along a moving path, and discharging the media clamped by the stacking mechanism towards the medium outlet relative to the stacking mechanism in a process of moving the stacking mechanism towards the medium outlet.

Further, the method further includes a medium recycling step, wherein the medium recycling step includes discharging the media clamped by the stacking mechanism towards the medium inlet relative to the stacking mechanism in a process of moving the stacking mechanism from the medium outlet to the medium inlet.

Further, the method further includes a medium collection step before the medium conveying step, wherein the medium collection step includes opening a lower stacking assembly of the stacking mechanism relative to an upper stacking assembly of the stacking mechanism to form a medium collection space, and closing the lower stacking assembly relative to the upper stacking assembly to clamp the media when the collection of the media is finished.

Further, the medium collection step further includes an alignment step, and the alignment step includes aligning front edges of the media conveyed from the medium inlet to the medium collection space along a conveying direction of the media in a process of opening the lower stacking assembly relative to the upper stacking assembly.

Further, the medium collection step further includes a failure recycling step, and the failure recycling step includes, when the media in the medium collection space need to be recycled, moving the stacking mechanism in a direction from the medium inlet to the medium outlet when the lower stacking assembly is opened relative to the upper stacking assembly, and simultaneously blocking the media so as to separate it from the medium collection space for recycling.

According to the other aspect of the disclosure, a sheet medium stacking conveying device is provided, which includes a frame, and a stacking mechanism capable of clamping and conveying media, wherein the sheet medium stacking conveying device further includes a driving mechanism for driving the stacking mechanism to reciprocally move along a moving path between a medium inlet and a medium outlet, and an actuating mechanism for discharging the media clamped by the stacking mechanism towards a direction of the medium outlet relative to the stacking mechanism.

Further, the actuating mechanism includes a first rack arranged on the moving path, and a power input gear arranged on the stacking mechanism; and the power input gear, in a process of moving the stacking mechanism towards a direction of the medium outlet, rolls relative to the first rack to discharge the media clamped by the stacking mechanism towards the direction of the medium outlet relative to the stacking mechanism.

Further, the stacking mechanism includes an upper stacking assembly, a lower stacking assembly movably connected with the upper stacking assembly, a first switching mechanism for opening the lower stacking assembly relative to the upper stacking assembly to form a medium collection space, and a first elastic element for closing the lower stacking assembly relative to the upper stacking assembly to clamp the media; each of the upper stacking assembly and the lower stacking assembly includes a belt conveying mechanism respectively; the belt conveying mechanism of the upper stacking assembly is in transmission connection with the power input gear; and the driving mechanism is in transmission connection with the upper stacking assembly.

Further, the stacking mechanism further includes a guide assembly arranged on two sides of the upper stacking assembly and the lower stacking assembly respectively; the guide assembly includes a first connecting rod and a second connecting rod; middle parts of the first connecting rod and the second connecting rod are pivoted; a first end of the first connecting rod is pivoted to the upper stacking assembly, and a second end of the first connecting rod is movably connected with the lower stacking assembly; and a first end of the second connecting rod is movably connected with the upper stacking assembly, and a second end of the second connecting rod is pivoted to the lower stacking assembly.

Further, a synchronous transmission mechanism is arranged between the belt conveying mechanism of the upper stacking assembly and the belt conveying mechanism of the lower stacking assembly; a groove extending along a rod length direction is formed in each of the first connecting rod and the second connecting rod respectively; and the synchronous transmission mechanism is located in the grooves of the first connecting rod and the second connecting rod.

Further, the device further includes a stopping plate arranged on the frame and located below the stacking mechanism, wherein the stopping plate is located in the medium collection space to align the collected media when the lower stacking assembly is opened relative to the upper stacking assembly.

Further, a flange is arranged on the lower stacking assembly, the first switching mechanism includes a pressing member pivoted to the frame, and a driving parts for driving the pressing member to swing around its pivoting shaft, and a pressing part capable of pressing the flange is arranged on the pressing member.

Further, the device further includes a limiting member arranged on the frame, wherein, when the lower stacking assembly is opened relative to the upper stacking assembly and when the stacking mechanism moves in a direction from the medium inlet to the medium outlet, the limiting member keeps the lower stacking assembly continuously opened relative to the upper stacking assembly.

Further, the device further includes a second rack being position-switchable and arranged on the moving path, a second switching mechanism for switching the second rack from an effective position to a failure position, and a second elastic element for returning the second rack to the effective position, wherein, the power input gear rolls relative to the second rack at the effective position to discharge the media clamped by the stacking mechanism towards a direction of the medium inlet relative to the stacking mechanism in the process of moving the stacking mechanism towards the medium inlet.

Further, the second switching mechanism is the first switching mechanism, a driving groove is formed on the second rack, a flange is arranged on the lower stacking assembly, the first switching mechanism includes a pressing member pivoted to the frame, and a driving part for driving the pressing member to swing around its pivoting shaft; a pressing part is arranged on the pressing member; wherein, the pressing part is spliced with the driving groove to drive the second rack to move to the failure position when the pressing member is at a swinging upper limit position, and the pressing part, when the pressing member is at a swinging lower limit position, is separated from the driving groove and matched with the flange in a pressing way, the second rack returns to the effective position.

Further, the frame includes a left side plate and a right side plate, which are arranged in parallel at an interval, the stacking mechanism is located between the left side plate and the right side plate, a guide groove is formed in the left side plate and the right side plate respectively, a support roller matched with the guide groove in a plugging way is arranged on the two sides of the upper stacking assembly respectively, the first rack and the first switching mechanism are located on outer side(s) of the left side plate and/or the right side plate, and the power input gear extends out of the guide groove to be located on the outer side(s) of the left side plate and/or the right side plate.

Further, the driving mechanism is a conveying belt mechanism or a conveying chain mechanism.

The stacking mechanism of the sheet medium stacking conveying device provided by the disclosure can reciprocally move between the collection position and discharge position of the media, and the media are discharged under the condition of no additional power source; and the sheet medium stacking conveying device is high in adaptability and low in cost.

Besides the purpose, characteristics and advantages described above, the disclosure has other purposes, characteristics and advantages, which are further described with the drawings in detail.

BRIEF DESCRIPTION OF DRAWINGS

The drawings forming a part of the specification and used for further understanding the disclosure show preferred embodiments of the disclosure, and is adopted to describe the principle of the disclosure together with the specification. In the drawings.

DESCRIPTION OF REFERENCES IN THE DRAWINGS 1. stacking mechanism;
2. (first) switching mechanism;
3. driving mechanism;
4. synchronous transmission mechanism;
11. upper stacking assembly;

12. lower stacking assembly;
13. guide assembly;
14. first elastic element;
21. driving wheel;
22. first rod;
23. pressing member;
24. transmission shaft;
31. motor toothed belt pulley;
32. first toothed belt;
33. first toothed belt pulley;
34. second toothed belt pulley;
35. second toothed belt;
41. power input gear;
42. second gear;
43. transition gear set;
44. intermediate wheel;
45. toothed belt;
46. toothed belt pulley;
47. first rack;
48. second rack;
49. second elastic element;
81. left side plate;
82. right side plate;
83. first guide groove;
84. second guide groove;
85. stopping plate;
86. limiting member;
88. support shaft;
41a. first branch gear;
41b. second branch gear;
44a. belt pulley part;
44b. gear part;
111. first belt pulley;
112. second belt pulley;
113. first belt;
114. first bracket;
121. third belt pulley;
122. fourth belt pulley;
123. second belt;
124. second bracket;
111a. first support shaft;
111b. first roller;
112a. second support shaft;
112b. second roller;
114a. support roller;
121a. third support shaft;
121b. third roller;
122a. fourth support shaft;
122b. fourth roller;
124a. open groove;
124b. flange;
131. first guide assembly;
132. second guide assembly;
131a. first connecting rod;
131b. second connecting rod;
132a. third connecting rod;
132b. fourth connecting rod;
231. pivoting shaft;
232. pressing part;
411. transmission shaft;
481. connecting hole;
482. driving groove; and
851. stopping part.

DETAILED DESCRIPTION

The embodiment of the disclosure is described below with reference to the drawings in detail, but the disclosure can be implemented by various modes defined and covered by claims.

The disclosure provides a sheet medium stacking conveying method, which includes a medium conveying step capable of meeting a stacking conveying requirement of media with a longer distance between a collection position and a discharge position. In addition, the method may further include a medium recycling step after the medium conveying step. The method may further include a medium collection step before the medium conveying step.

Wherein, the medium conveying step is as follows: moving a stacking mechanism for clamping the media from a medium inlet to a medium outlet along a moving path, and discharging the media clamped by the stacking mechanism towards the medium outlet relative to the stacking mechanism in a process that the stacking mechanism moves towards the medium outlet. For example, a first rack is arranged on the moving path (linear moving path, for example), the stacking mechanism is provided with a power input gear, and the power input gear rolls relative to the first rack in the process that the stacking mechanism moves towards the medium outlet, thereby discharging the media clamped by the stacking mechanism towards the medium outlet relative to the stacking mechanism.

Wherein, the medium recycling step is as follows: discharging the media clamped by the stacking mechanism towards the medium inlet relative to the stacking mechanism in a process that the stacking mechanism moves from the medium outlet to the medium inlet. For example, a second rack being position-avoidable is arranged on the moving path, and the power input gear rolls relative to the second rack in a process that the stacking mechanism moves from the medium outlet to the medium inlet, thereby discharging the media clamped by the stacking mechanism towards the medium inlet relative to the stacking mechanism.

Wherein, the medium collection step is as follows: opening a lower stacking assembly of the stacking mechanism relative to an upper stacking assembly of the stacking mechanism to form a medium collection space, for example in a translation manner, and closing the lower stacking assembly relative to the upper stacking assembly to clamp the media when the collection of the media completes.

Preferably, the medium collection step further includes an alignment step, and the alignment step includes aligning front edges of the media conveyed from the medium inlet to the medium collection space along a conveying direction of the media in a process of opening the lower stacking assembly relative to the upper stacking assembly. For example, making a stopping plate below the lower stacking assembly enter the medium collection space so that the media conveyed from the medium inlet to the medium collection space is aligned along the stopping plate.

Preferably, the medium collection step further includes a failure recycling step, and the failure recycling step includes when the media in the medium collection space are required to be recycled, moving the stacking mechanism in a direction from the medium inlet to the medium outlet when the lower stacking assembly is opened relative to the upper stacking assembly, and separating the media from the medium collection space for recycling by blocking the media. For example, blocking the media by the stopping plate in the alignment step so as to fall into a set recycling box.

Wherein, the stacking mechanism is provided with a first belt conveying mechanism and a second belt conveying mechanism, which clamp and convey the media, and for example, the first belt conveying mechanism is arranged on the upper stacking assembly, and the second belt conveying mechanism is arranged on the lower stacking assembly, wherein the lower stacking assembly can be opened relative to the upper stacking assembly to form the medium collection space of a stack of media, and the lower stacking assembly can be closed relative to the upper stacking assembly to clamp the stack of media.

Figure 2:
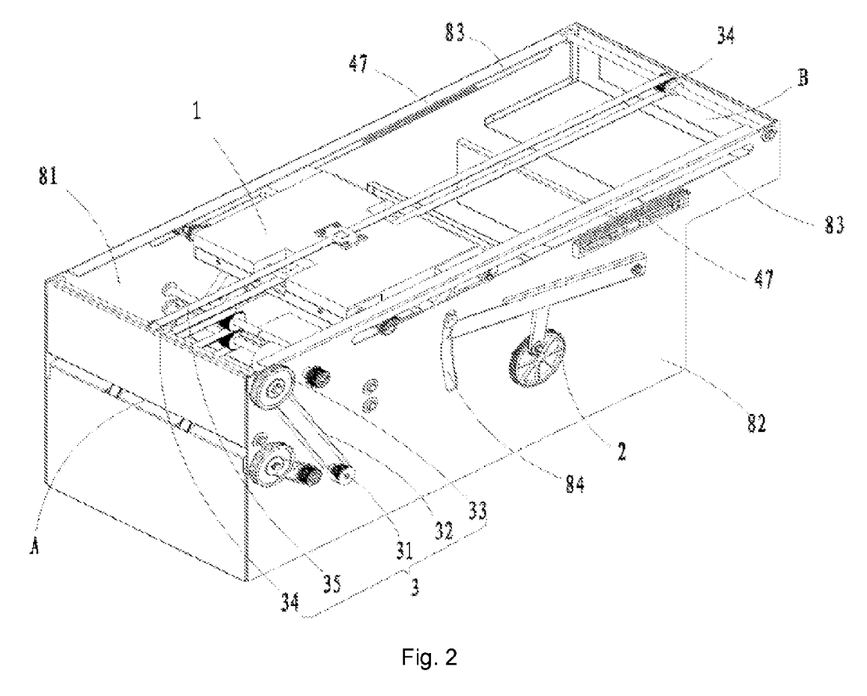
FIG. 2 is a first isometric view of a sheet medium stacking conveying device provided by a first embodiment of the disclosure.

FIG. 2 is a first isometric view of a sheet medium stacking conveying device provided by a first embodiment of the disclosure. As shown in FIG. 2, the sheet medium stacking conveying device includes a frame, a stacking mechanism 1, a switching mechanism 2, a driving mechanism 3, an actuating mechanism, and at least one synchronous transmission mechanism 4.

Wherein, the frame includes a left side plate 81 and a right side plate 82, which are relatively parallel, and a moving passage of the stacking mechanism 1 is formed between the left side plate 81 and the right side plate 82, wherein a distance between the left side plate 81 and the right side plate 82 is a width of the moving passage, and the width is adapted to that of the stacking mechanism 1; one end of a length direction of the moving passage is connected with a medium inlet A of the sheet medium stacking conveying device, and the other end is connected with a medium outlet B of the sheet medium stacking conveying device; and the stacking mechanism 1 is located in the moving passage, and can move along the length direction of the moving passage.

A first guide groove 83 and a second guide groove 84 are formed in each of the left side plate 81 and the right side plate 82, and the first guide groove 83 and second guide groove 84 in the left side plate and the first guide groove 83 and second guide groove 84 in the right side plate 82 are symmetric about a width centre of the moving passage, wherein the first guide groove 83 extends along the length direction of the moving passage, and the second guide grooves 84 is a section of circular arc groove with a set length.

Figure 3:
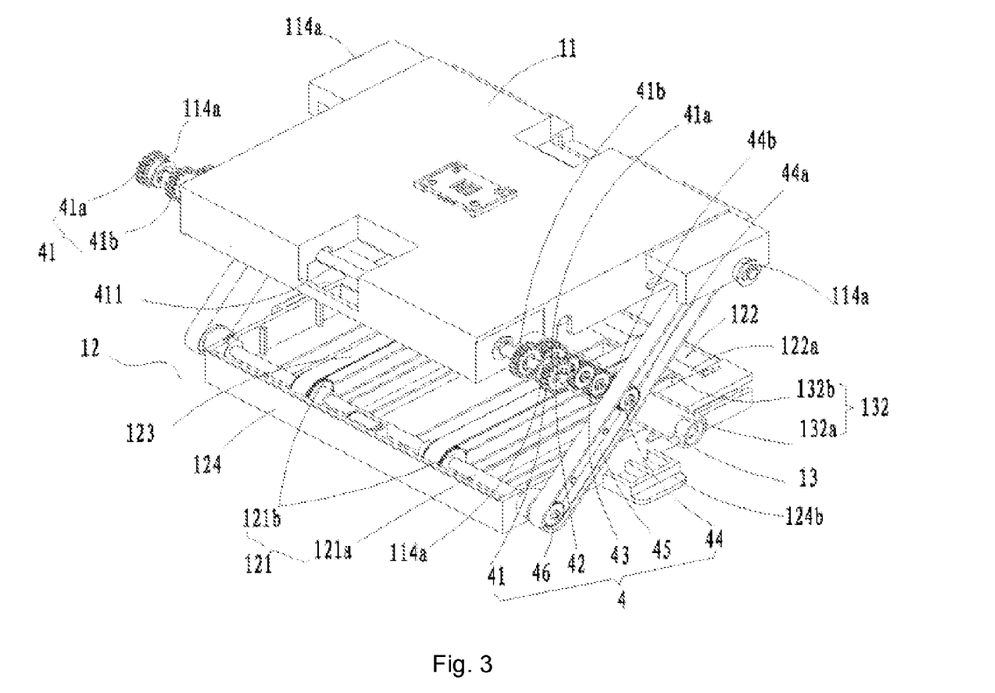
FIG. 3 is a first isometric view of a stacking mechanism of a sheet medium stacking conveying device provided by a first embodiment of the disclosure.
Figure 4:
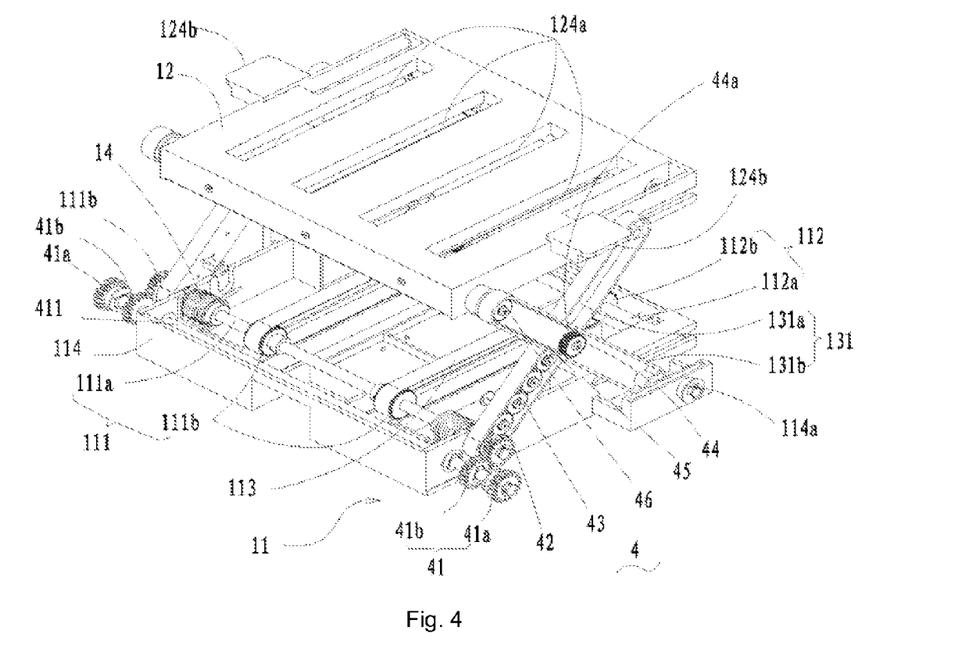
FIG. 4 is a second isometric view of a stacking mechanism of a sheet medium stacking conveying device provided by a first embodiment of the disclosure.

FIG. 3 is a first isometric view of a stacking mechanism of a sheet medium stacking conveying device provided by a first embodiment of the disclosure, and FIG. 4 is a second isometric view of a stacking mechanism of a sheet medium stacking conveying device provided by a first embodiment of the disclosure. An embodiment of the stacking mechanism 1 will be described below with reference to FIG. 3 and FIG. 4.

Wherein, the stacking mechanism 1 is located between the left side plate 81 and right side plate 82 of the frame, and under the driving of driving mechanism 3, can reciprocally move between a collection position and a discharge position. When the stacking mechanism 1 is at the collection position, the media entering from the medium inlet A can be received. When the stacking mechanism is at the discharge position, the collected media can be discharged from the sheet medium stacking conveying device through the medium outlet B. The stacking mechanism 1 includes an upper stacking assembly 11, a lower stacking assembly 12, a guide assembly 13, and a first elastic element 14.

The upper stacking assembly 11 includes a first belt pulley 111, a second belt pulley 112, a first belt 113, and a first bracket 114. Wherein, at least two support rollers 114a are arranged on each of left and right sides of the first bracket 114, and an axis of each support roller 114a extends along a width direction of the moving passage. The at least two support rollers 114a on the left side of the first bracket 114 are matched with the first guide groove 83 in the left side plate 81 in a plugging way, the at least two support rollers 114a on the right side of the first bracket 114 are matched with the first guide groove 83 in the right side plate 82 in the plugging way, and each of the support rollers 114a can reciprocally move along the length direction of the first guide groove 83, thereby guiding the first bracket 114 to move along the length direction of the moving passage. Preferably, the support roller 114a is a bearing capable of freely rotating around own axis.

The first belt pulley 111 and the second belt pulley 112 are arranged along the length direction of the moving passage, wherein the first belt pulley 111 includes a first support shaft 111a and a first roller 111b, the first support shaft 111a extends along the width direction of the moving passage, two ends of the first support shaft 111a are supported by the first bracket 114, and the first support shaft 111a can freely rotate around own axis; the first roller 111b is fixedly connected to an outer periphery of the first support shaft 111a in a sleeving way, may be an integrated roller adapted to a width of the media, or may also be a plurality of segmented rollers which are arranged at intervals along an axial direction of the first support shaft 111a. The second belt pulley 112 includes a second support shaft 112a and a second roller 112b, the second support shaft 112a is parallel to the first support shaft 111a, two ends of the second support shaft 112a are supported by the first bracket 114, the second support shaft 112a can freely rotate around own axis, and the second roller 112b is fixedly connected to an outer periphery of the second support shaft 112a in the sleeving way, may be an integrated roller adapted to the width of the media, or may also be a plurality of segmented rollers which are arranged at intervals along an axial direction of the second support shaft 112a. The first belt 113 is wound on outer peripheries of the first belt pulley 111 and the second belt pulley 112, and is supported by the first roller 111b of the first belt pulley 111 and the second roller 112b of the second belt pulley 112. In the embodiment, both of the first roller 111b and the second roller 112b are two segmented rollers.

The lower stacking assembly 12 includes a third belt pulley 121, a fourth belt pulley 122, a second belt 123, and a second bracket 124. The third belt pulley 121 and the fourth belt pulley are arranged along the length direction of the moving passage, wherein the third belt pulley 121 includes a third support shaft 121a and a third roller 121b, the third support shaft 121a extends along the width direction of the moving passage, two ends of the third support shaft 121a are supported by the second bracket 124, the third support shaft 121a can freely rotate around own axis. The third roller 121b is fixedly connected to an outer periphery of the third support shaft 121a in the sleeving way, may be an integrated roller adapted to a width of the media, and may also include a plurality of segmented rollers which are arranged at intervals along an axial direction of the third support shaft 121a. The fourth belt pulley 122 includes a fourth support shaft 122a and a fourth roller 122b, the fourth support shaft 122a is parallel to the third support shaft 121a. Two ends of the fourth support shaft 122a are supported by the second bracket 124, the fourth support shaft 122a can freely rotate around own axis. The fourth roller 112b is fixedly connected to an outer periphery of the fourth support shaft 122a in the sleeving way, may be an integrated roller adapted to the width of the media, and may also include a plurality of segmented rollers which are arranged at intervals along an axial direction of the fourth support shaft 122a. The second belt 123 is wound on outer peripheries of the third belt pulley 121 and the fourth belt pulley 122, and is supported by the third roller 121b of the third belt pulley 121 and the fourth roller 122b of the fourth belt pulley.

In the embodiment, the third roller 121b and the fourth roller 122b are two segmented rollers corresponding to the first roller 111b and the second roller 112b respectively.

The guide assembly 13 includes a first guide assembly 131 and a second guide assembly 132, which are located on two sides of the upper stacking assembly 11 and the lower stacking assembly 12 along the width direction of the moving passage respectively. The lower stacking assembly 12 can move in parallel relative to the upper stacking assembly 11 along a stacking direction of the media through the first guide assembly 131 and the second guide assembly 132, and can be opened or closed relative to the upper stacking assembly 11.

Wherein, the first guide assembly 131 includes a first connecting rod 131a and a second connecting rod 131b, and middle parts of the first connecting rod 131a and the second connecting rod 131b are pivoted to form a scissors structure through a pivoting shaft (not shown in Figs), wherein, a first end of the first connecting rod 131a is hinged to a first end of the first support shaft 111a, and a second end of the first connecting rod 131a is movably connected with the second bracket 124, and can move along the length direction of the moving passage. A first end of the second connecting rod 131b is hinged to a first end of the third support shaft 121a, and a second end of the second connecting rod 131b is movably connected with the first bracket 114, and can move along the length direction of the moving passage. The second guide assembly 132 includes a third connecting rod 132a and a fourth connecting rod 132b, and middle parts of the third connecting rod 132a and the fourth connecting rod 132b are pivoted to form a scissors structure through a pivoting shaft (not shown in Figs), wherein a first end of the third connecting rod 132a is hinged to a second end of the first support shaft 111a, and a second end of the third connecting rod 132a is movably connected with the second bracket 124, and can move along the length direction of the moving passage. A first end of the fourth connecting rod 132b is hinged to a second end of the third support shaft 121a, and a second end of the fourth connecting rod 132b is movably connected with the first bracket 114, and can move along the length direction of the moving passage.

In such a way, under the action of the switching mechanism 2, the lower stacking assembly 12 can move in parallel relative to the upper stacking assembly 11 along the stacking direction of the media, and can be opened or closed relative to the upper stacking assembly 11. When the lower stacking assembly 12 is closed relative to the upper stacking assembly 11, the media is clamped between the second belt 123 of the lower stacking assembly 12 and the first belt 113 of the upper stacking assembly 11, and a paper feeding passage for conveying the media is formed between the second belt 123 and the first belt 113. When the lower stacking assembly 12 is opened relative to the upper stacking assembly 11, the lower stacking assembly 12 is separated from the upper stacking assembly 11, the first belt 113 and the second belt 123 are at a set distance, a medium collection space for accommodating and stacking the media is formed between the first belt 113 and the second belt 123, and the media can be stacked on the lower stacking assembly 12.

Figure 5:
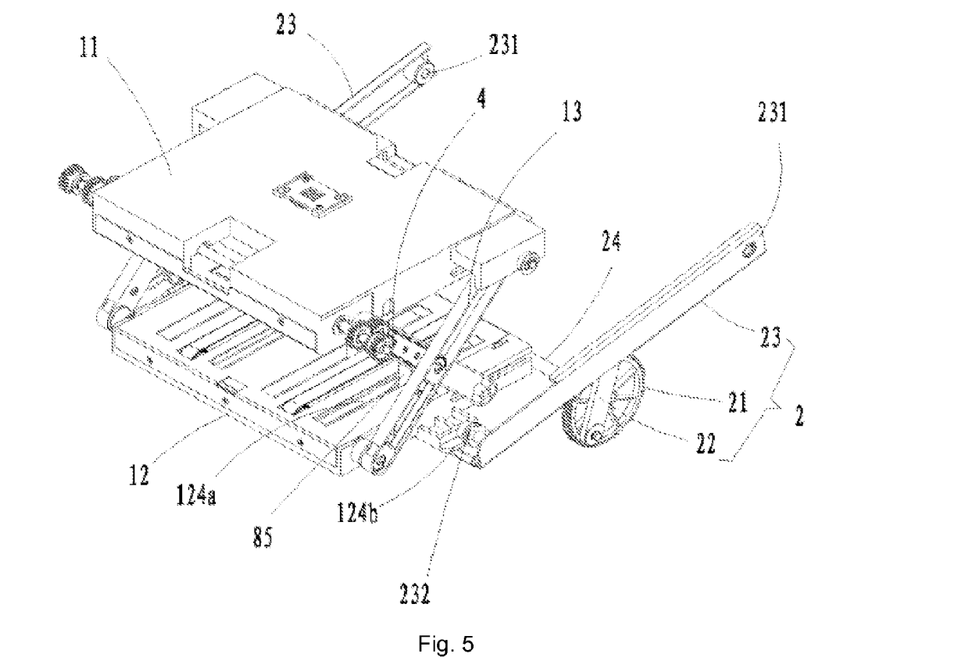
FIG. 5 is a structure view of a stacking mechanism of a sheet medium stacking conveying device provided by a first embodiment of the disclosure when a lower stacking assembly is opened relative to an upper stacking assembly.
Figure 6:
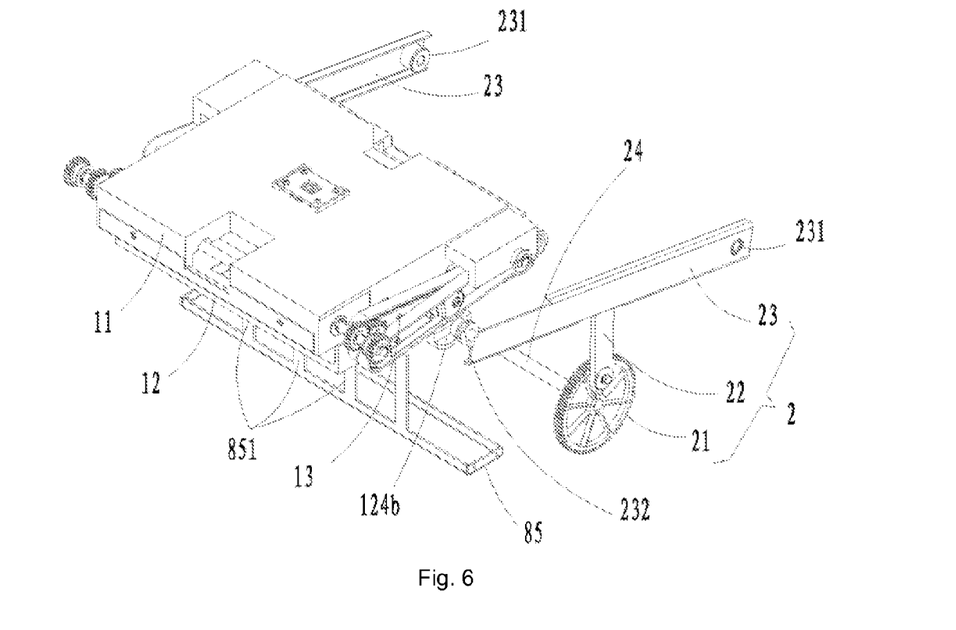
FIG. 6 is a structure view of a stacking mechanism of a sheet medium stacking conveying device provided by a first embodiment of the disclosure when a lower stacking assembly is closed relative to the upper stacking assembly.

Furthermore, as shown in FIG. 5 and FIG. 6, the frame further includes a stopping plate 85 located between the left side plate 81 and the right side plate 82. The stopping plate 85 includes a plurality of stopping parts 851 arranged at intervals along the width direction of the moving passage and extending along a direction perpendicular to a surface of the second belt 123 of the lower stacking assembly 12. When the lower stacking assembly 12 is opened relative to the upper stacking assembly 11, the plurality of stopping parts 851 of the stopping plate 85 pass through an open groove 124a in the second bracket 124 of the lower stacking assembly 12 to enter the medium collection space, and are located at a tail end of the stacking mechanism 1 along a conveying direction of the media, and the media are aligned along the stopping parts 851 of the stopping plate 85 when being stacked on the surface of the second belt 123 of the lower stacking assembly 12. When the lower stacking assembly 12 is closed relative to the upper stacking assembly 11, the lower stacking assembly 12 is separated from the stopping parts 851 of the stopping plate 85, and the stacked media can be conveyed through the first belt 113 and the second belt 123.

One end of the first elastic element 14 is connected with the upper stacking assembly 11, the other end of the first elastic element 14 is connected with the lower stacking assembly 12 or the guide assembly 13. Under the action of the first elastic element 14, the lower stacking assembly 12 always has a movement tendency of pressing the upper stacking assembly 11 and being closed relative to the upper stacking assembly 11. In the embodiment, the first elastic element 14 is a torsional spring, and is connected to the first support shaft 111a in the sleeving way, a first end of the first elastic element 14 is connected with the first bracket 114, a second end of the first elastic element 14 is connected with the first connecting rod 131 of the guide assembly 13, and under the action of torsion of the torsional spring, the lower stacking assembly 12 always has a movement tendency of pressing the upper stacking assembly 11 and being closed relative to the upper stacking assembly 11.

FIG. 5 is a structure view of a stacking mechanism of a sheet medium stacking conveying device provided by a first embodiment of the disclosure when a lower stacking assembly is opened relative to an upper stacking assembly, and FIG. 6 is a structure view of a stacking mechanism of a sheet medium stacking conveying device provided by a first embodiment of the disclosure when a lower stacking assembly is closed relative to the upper stacking assembly. An embodiment of the switching mechanism 2 will be introduced below with reference to FIG. 2, FIG. 5 and FIG. 6. As shown in the drawings, the switching mechanism 2 includes a switching motor (not shown in the Figs.) and at least one switching assembly.

Wherein, the switching assembly is arranged on the left side plate 81 or right side plate 82 of the frame, is in transmission connection with the switching motor, and includes a pressing member 23 and a driving part consisting of a driving wheel 21 and a first rod 22. Wherein, the driving wheel 21 is in transmission connection with a power part such as the switching motor, can rotate around own axis under the driving of the switching motor, and may be a cam or gear. The pressing member 23 is in transmission connection with the driving wheel 21 through the first rod 22, one end of the pressing member 23 is pivoted to the frame through a pivoting shaft 231, and a pressing part 232 is arranged at a free end of the pressing member 23, wherein the pressing part 232 is matched with the second guide groove 84 in the left side plate 81 or the right side plate 82 in the plugging way. When the driving wheel 21 rotates around own axis, the pressing member 23 can be driven to swing around the pivoting shaft 231. Under the limitation of lengths of the second guide grooves 84, the pressing member 23 has a swinging lower limit position and a swinging upper limit position.

When the stacking mechanism 1 is at the collection position, the pressing member 23 can contact with or be separated from a flange 124b on the second bracket 124 of the lower stacking assembly 12, and at the same time, when the pressing member 23 is at the swinging lower limit position, the pressing part 232 of the pressing member 23 presses the flange 124b of the second bracket 124 of the lower stacking assembly 12 so as to separate the lower stacking assembly 12 from the upper stacking assembly 11, thereby opening the lower stacking assembly 12 of the stacking mechanism 1 relative to the upper stacking assembly 11 to form the medium collection space; and when the pressing member 23 is at the swinging upper limit position, the pressing part 232 is separated from the flange 124b of the second bracket 124, and the lower stacking assembly 12, under the action of the first elastic element 14, is closed relative to the upper stacking assembly 11 to clamp the media between the upper stacking assembly 11 and the lower stacking assembly 12. It is important to note that the pressing part 232 of the pressing member 23 is separated from the flanges 124b of the second bracket 124 during the stacking mechanism 1 moves from the collection position to the discharge position and when the stacking mechanism is at the discharge position.

In the embodiment, the switching mechanism 2 includes two switching assemblies, and the two switching assemblies are arranged on outer sides of the left side plate 81 and the right side plate 82 respectively, and are symmetric about the width centre of the moving passage. The driving wheels 21 in the two switching assemblies are gears, and are coaxially and fixedly connected through a transmission shaft 24, and the switching motor is in transmission connection with one of the driving wheels 21. Wherein, one end of the first rod 22 is pivoted to the driving wheel 21, a pivoting position is at a set distance away from a centre of the driving wheel, and the other end of the first rod 22 is pivoted to the middle part of the pressing member 23; one end of the pressing member 23 located on the outer side of the left side plate 81 is pivoted with the left side plate 81 through the corresponding pivoting shaft 231, and the other end of the pressing member 23 is provided with the pressing part 232, and the pressing part 232 is matched with the second guide groove 84 in the left side plate 81 in the plugging way. One end of the pressing member 23 located on the outer side of the right side plate 82 is pivoted to the right side plate 82 through the pivoting shaft 231, and the other end of the pressing member 23 is provided with the pressing part 232, and the pressing member 23 is matched with the second guide groove 84 in the right side plate 82 in the plugging way. Under the limitation of the length of the second guide groove 84, the pressing member 23 has a swinging lower limit position and a swinging upper limit position when swinging around the pivoting shaft 231. When the switching motor drives the driving wheel 21 in transmission connection with the switching motor, the other driving wheel 21 can be synchronously driven by the transmission shaft 24, thereby driving the pressing members 23 in the two switching assemblies on the two sides of the stacking mechanism 1 to swing between the swinging lower limit positions and the swinging upper limit positions around their own pivoting shafts 231 respectively so as to enable the pressing parts 232, extending into the left side plate 81 and the right side plate 82, of the two pressing members 23 to contact with or be separated from the flanges 124b of the second bracket 124 of the lower stacking assembly from the two sides, thereby applying evenly stress on the stacking mechanism 1.

As shown in FIG. 2, the driving mechanism 3 includes a driving motor (not shown in FIG. 2), a motor toothed belt pulley 31, a first toothed belt 32, a first toothed belt pulley 33, two second toothed belt pulleys 34, and a second toothed belt 35. Wherein the driving motor is supported by the frame; the motor toothed belt pulley 31 is fixedly connected with an output shaft of the driving motor. The two second toothed belt pulleys 34 are arranged along the length direction of the moving passage, and are close to the medium inlet A and medium outlet B of the sheet medium stacking conveying device respectively. Both of the second toothed belt pulleys 34 are supported by the left side plate 81 and the right side plate 82, and axes of the two second toothed belt pulleys 34 extend along the width direction of the moving passage. The first toothed belt pulley 33 is coaxially and fixedly connected with one of the second toothed belt pulleys 34. The first toothed belt 32 is wound on outer peripheries of the motor toothed belt pulley 31 and the first toothed belt pulley 33, is supported by the motor toothed belt pulley 31 and the first toothed belt pulley 33, and is used for transmitting torque output by the driving motor to the first toothed belt pulley 33. The second toothed belt 35 is wound on outer peripheries of the two second toothed belt pulleys 34, is supported by the two second toothed belt pulleys 34, and is also fixedly connected with the first bracket 114 of the stacking mechanism 1. Thus, when the output shaft of the driving motor rotates forwards or backwards, the second toothed belt 35 is driven to move by the motor toothed belt pulley 31, the first toothed belt 32, the first toothed belt pulley 33, and the two second toothed belt pulleys 34, thereby driving the stacking mechanism 1 to reciprocally move between the collection position and the discharge position.

It is important to note that the driving mechanism 3, in the other embodiments provided by the disclosure, may be a chain conveying mechanism so as to drive the stacking mechanism 1 to reciprocally move between the collection position and the discharge position. For example, the two second toothed belt pulleys 34 are replaced by two chain wheels, the second toothed belt 35 is replaced by a chain wound on the two chain wheels, while the chain is fixedly connected with the first bracket 114 of the stacking mechanism 1. Thus, when the output shaft of the driving motor rotates forwards or backwards, the chain is driven to move by the motor toothed belt pulley 31, the first toothed belt 32, the first toothed belt pulley 33, and the two chain wheels, thereby driving the stacking mechanism 1 to reciprocally move between the collection position and the discharge position.

The actuating mechanism includes a power input gear 41 and a first rack 47, wherein the first racks 47 is arranged on the left side plate 81 or right side plate 82 of the frame, is close to the medium outlet B, extends along the length direction of the moving passage, and has a set length. The power input gear 41 is supported on the first bracket 114, and can be engaged with or separated from the first racks 47 when the stacking mechanism moves along the first guide groove 83. When the driving mechanism 3 drives the stacking mechanism 1 to move to the medium outlet B, the power input gear 41 rolls relative to the first racks 47 to provide power for the synchronous transmission mechanism 4 of the stacking mechanism 1 so that the synchronous transmission mechanism 4 transmits the power to the first belt 113 of the upper stacking assembly and the second belt 123 of the lower stacking assembly 12, thereby externally discharging the media clamped between the first belt 113 and the second belt 123 relative to the stacking mechanism 1.

The synchronous transmission mechanism 4 is used for enabling the first belt 113 of the upper stacking assembly and the second belt 123 of the lower stacking assembly 12 to synchronously move. The synchronous transmission mechanism 4 includes a second gear 42, a transition gear set 43, an intermediate wheel 44, a toothed belt 45, and a toothed belt pulley 46. Wherein the second gear 42 is fixedly arranged at one end of the first support shaft 111a, and is engaged with the power input gear 41. The intermediate wheel 44 is connected to the pivoting shaft of the first connecting rod 131a and the second connecting rod 131b, or the pivoting shaft of the third connecting rod 132a and the fourth connecting rod 132b in the sleeving way, and can freely rotate around the axis of the pivoting shaft. The intermediate wheel 44 includes a belt pulley part 44a and a gear part 44b, which are coaxially and fixedly connected. The toothed belt pulley 46 is fixedly arranged at one end of the third support shaft 121a. The transition gear set 43 is arranged on the first connecting rod 131a or the third connecting rod 132a, one end of the transition gear set 43 is engaged with the second gear 42, and the other end of the transition gear set 43 is engaged with the gear part 44b of the intermediate wheel 44. The toothed belt 45 is sheathed outside an outer periphery of the belt pulley part 44a of the intermediate wheel 44 and the toothed belt pulleys 46, and realizes transmission connection between the belt pulley part 44a of the intermediate wheel 44 and the toothed belt pulley 46. In the embodiment, a groove (not shown in the Figs.) extending along a rod length direction is provided in the first connecting rod 131a and the second connecting rod 131b respectively, wherein the second gear 42, the transition gear set 43, and the gear part 44b of the intermediate wheel 44 are located in the groove of the first connecting rod 131a, and the belt pulley part 44a of the intermediate wheel 44, the toothed belt 45, and the toothed belt pulley 46 are located in the groove of the second connecting rod 131b.

When the stacking mechanism 1 moves to a set position along the moving passage, the power input gear 41 is engaged with the first rack 47. Along with the movement of the stacking mechanism 1, the first rack 47 drives the power input gear 41 to rotate around own axis so as to drive the second gear 42 to drive the first support shaft 113a and the first belt 113 to move, and meanwhile, the toothed belt pulley 46 can be driven by the transition gear set 43, the intermediate wheel 44, and the toothed belt 45 to rotate so as to drive the second support shaft 123a and the second belt 123 to move to discharge the media between the first belt 113 and the second belt 123 from the stacking mechanism 1 to the direction of the medium outlet B.

In the embodiment, the sheet medium stacking conveying device includes two actuating mechanisms and two synchronous transmission mechanisms 4, wherein the two actuating mechanisms and the two synchronous transmission mechanisms 4 are located on the two sides of the stacking mechanism 1 along the width direction of the moving passage respectively, and are symmetric about the width centre of the stacking mechanism 1. Wherein, the first racks 47 in the two actuating mechanisms are located on the outer sides of the left side plate 81 and the right side plate 82 respectively, and are fixedly connected with the left side plate 81 and the right side plate 82 respectively. The power input gears 41 in the two actuating mechanisms are located on the two sides of the first bracket 114 respectively, and are coaxially and fixedly connected through a transmission shaft 411, the transmission shaft 411 is pivoted to the first bracket 114, and can freely rotate around own axis. The power input gear 41 includes a first branch gear 41a and a second branch gear 41b, which are coaxially and fixedly connected, the first branch gears 41a are located outside the moving passage, the second branch gears 41b are located in the moving passage. When the stacking mechanism 1 moves to the set position along the first guide grooves 83, the first branch gears 41a of the two power input gears 41 can be simultaneously engaged with the two first racks 47 respectively. The second gears 42 in the two synchronous transmission mechanisms 4 are fixedly arranged at the two ends of the first support shaft 111a respectively, and are engaged with the second branch gears 41b of the corresponding power input gears 41 respectively.

The intermediate wheels 44 in the two synchronous transmission mechanisms 4 are connected to the pivoting shaft of the first guide assembly 131 and the pivoting shaft of the second guide assembly 132 in the sleeving way respectively. The toothed belt pulleys 46 in the two synchronous transmission mechanisms 4 are fixedly arranged at the two ends of the third support shaft 121a. The transition gear sets 43 in the two synchronous transmission mechanism 4 are arranged on the first connecting rod 131a and the third connecting rod 132a respectively, one end of each transition gear set 43 is engaged with the corresponding second gear 42, and the other end of each transition gear set 43 is engaged with the gear part 44b of the corresponding intermediate wheel 44. The toothed belts 45 in the two synchronous transmission mechanisms 4 are sheathed outside the outer peripheries of the belt pulley parts 44a of the corresponding intermediate wheels 44 and the corresponding toothed belt pulleys 46 respectively, and realize transmission connection between the belt pulley parts 44a of the intermediate wheels 44 and the toothed belt pulleys 46.

When the stacking mechanism 1 moves to the set position along the length direction of the moving passage, the first branch gears 41a of the power input gears 41 in the two actuating mechanisms are engaged with the first racks 47 located on the outer sides of the left side plate 81 and the right side plate 82 respectively. The two power input gears 41 rotate around own axes to drive the second gears 42 in the two synchronous transmission mechanisms 4 to rotate so as to drive the first support shaft 111a and the first belt 113 to move from the two sides, and meanwhile, the toothed belt pulleys 46 can be driven by the transition gear sets 43, the intermediate wheels 44 and the toothed belts 45 to rotate so as to drive the third support shaft 121a and the second belt 123 to move from the two sides to discharge the media between the first belt 113 and the second belt 123 from the stacking mechanism 1 to the medium outlet B. In the embodiment, the two synchronous transmission mechanisms 4 simultaneously drive the first belt 113 and the second belt 123 to move from the two sides of the stacking mechanism 1, so that the media can be conveyed more reliably.

A working process of the sheet medium stacking conveying device provided by the disclosure will be introduced below.

In an initial state, the stacking mechanism 1 is at the collection position. When the media are required to be stacked, a control device (not shown in the Figs.) of the sheet medium stacking conveying device controls the driving wheels 21 of the switching mechanism 2 to rotate so as to drive the pressing members 23 to rotate towards the swinging lower limit positions. The pressing parts 232 of the pressing members 23 press the flanges 124b of the second bracket 124 of the lower stacking assembly 12 to drive the lower stacking assembly 12 to move away from the upper stacking assembly 11 along the stacking direction of the media so as to open the lower stacking assembly 12 relative to the upper stacking assembly 11. The second belt 123 of the lower stacking assembly 12 is at the set distance away from the first belt 113 of the upper stacking assembly 11, and the medium collection space for stacking the media is formed between the second belt 123 and the first belt 113.

The stopping parts 851 of the stopping plate 85 are spliced with the open grooves 124a in the second bracket 124, and extend into the medium collection space. The first belt 113 and the second belt 123 are in a stationary state.

The media enter the medium collection space between the upper stacking assembly 11 and the lower stacking assembly 12 one by one, are blocked by the stopping parts 851 of the stopping plate 85 to be stacked on the surface of the lower stacking assembly 12, and are aligned along the stopping parts 851 of the stopping plate 85.

After the stacking of a certain quantity of media is finished, the media temporarily stored on the surface of the lower stacking assembly 12 need to be discharged through the medium outlet B of the sheet medium stacking conveying device at one time. First, the control device of the sheet medium stacking conveying device controls the driving wheels 21 of the switching mechanism 2 to rotate so as to drive the pressing members 23 to rotate from the swinging lower limit positions to the swinging upper limit positions. The pressing parts 232 of the pressing members 23 are separated from the flanges 124b of the second bracket 124 of the lower stacking assembly 12. The lower stacking assembly 12 is closed relative to the upper stacking assembly 11 to clamp the stacked media between the first belt 113 of the upper stacking assembly 11 and the second belt 123 of the lower stacking assembly 12 under the action of the first elastic element 14. And then the control device controls the driving mechanism 3 to drive the second toothed belt 35 to drive the stacking mechanism 1 to move from the collection position to the discharge position. When the stacking mechanism 1 moves to the set position, the first branch gears 41a of the power input gears 41 of the actuating mechanisms are engaged with the first racks 47. Along with the continuous movement of the stacking mechanism 1, the first belt 113 and the second belt 123 are driven by the synchronous transmission mechanisms 4 to synchronously move so as to drive the media located between the first belt 113 and the second belt 123 to be discharged towards the direction of the medium outlet B. When the stacking mechanism 1 moves to the medium outlet B, the driving motor of the driving mechanism 3 stops rotating, the first belt 113 and the second belt 123 stop moving, and tails of the media are clamped between the first belt 113 and the second belt 123 to wait for being taken away by a user.

The sheet medium stacking conveying device provided by the disclosure includes the stacking mechanism, the switching mechanism, the driving mechanism, the actuating mechanisms, the synchronous transmission mechanisms, and the first elastic element. The stacking mechanism, under the driving of the driving mechanism, can move between the collection position close to the medium inlet of the sheet medium stacking conveying device and the discharge position close to the medium outlet of the sheet medium stacking conveying device. When the stacking mechanism is at the collection position, the switching mechanism can drive the lower stacking assembly of the stacking mechanism to be opened relative to the upper stacking assembly, and the first elastic element can drive the lower stacking assembly of the stacking mechanism to be closed relative to the upper stacking assembly. When the lower stacking assembly of the stacking mechanism is opened relative to the upper stacking assembly, the medium collection space is formed between the upper stacking assembly and the lower stacking assembly, and the media entering from the medium inlet can be collected. When the lower stacking assembly of the stacking mechanism is closed relative to the upper stacking assembly, the first belt of the upper stacking assembly and the second belt of the lower stacking assembly clamp the collected media, the stacking mechanism moves from the collection position to the discharge position under the driving of the driving mechanism. At the same time of movement of the stacking mechanism, the first belt of the upper stacking assembly and the second belt of the lower stacking assembly are driven by the movement of the stacking mechanism through the actuating mechanisms and the synchronous transmission mechanisms to synchronously move so as to discharge the media located between the two belts.

The stacking mechanism of the sheet medium stacking conveying device provided by the disclosure, under the driving of the driving mechanism, can reciprocally move between the collection position and discharge position of the media, and the media are discharged without adding power source, so that the sheet medium stacking conveying device provided by the disclosure is high in adaptability and low in cost.

It is important to note that the guide assembly of the stacking mechanism is not limited to the scissors structure described in the abovementioned embodiment. In other embodiments, the guide assembly of the stacking mechanism may be a plurality of guide pillars so that the lower stacking assembly moves in parallel relative to the upper stacking assembly along the plurality of guide pillars. The first elastic element of the stacking mechanism may be a tension spring between the upper stacking assembly and lower stacking assembly of the stacking mechanism. The synchronous transmission mechanisms between the upper stacking assembly and the lower stacking assembly are not limited to the transmission mechanisms described in the abovementioned embodiment, in other embodiments, other structural forms can be adopted, such as a transmission shaft extending along the stacking direction of the media, a first bevel gear fixedly connected with the transmission shaft, and a second bevel gear in a sliding connection with the transmission shaft. Wherein, the first bevel gear is in a steering transmission connection with the upper stacking assembly, and the second bevel gear is in a steering transmission connection with the lower stacking assembly, so that the upper stacking assembly and the lower stacking assembly can synchronously move.

Figure 7:
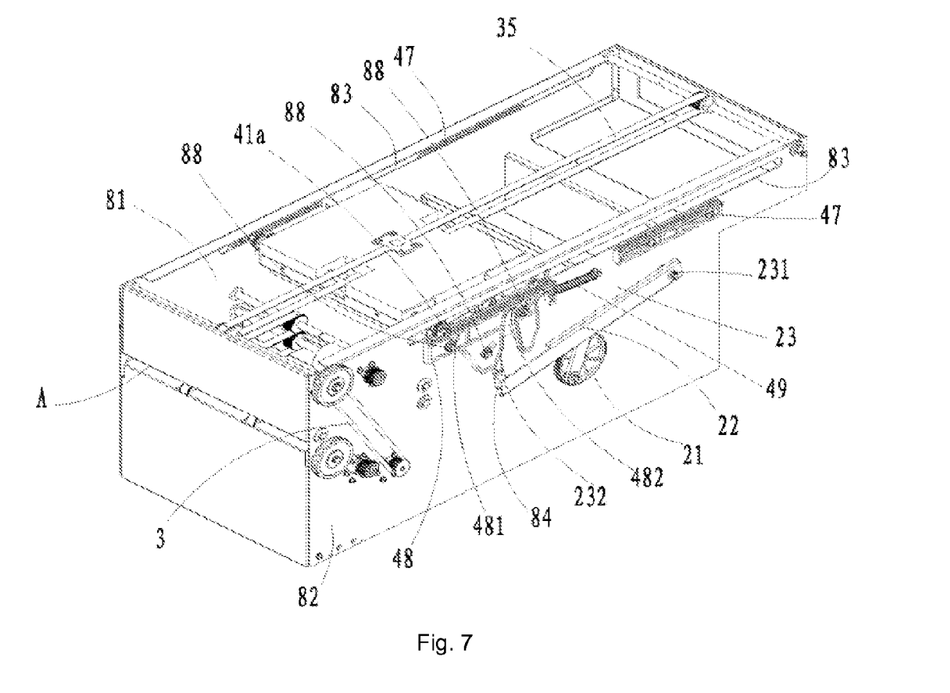
FIG. 7 is an isometric view of a sheet medium stacking conveying device provided by a second embodiment of the disclosure, wherein a pressing member of a switching mechanism locates at a swinging lower limit position.
Figure 8:
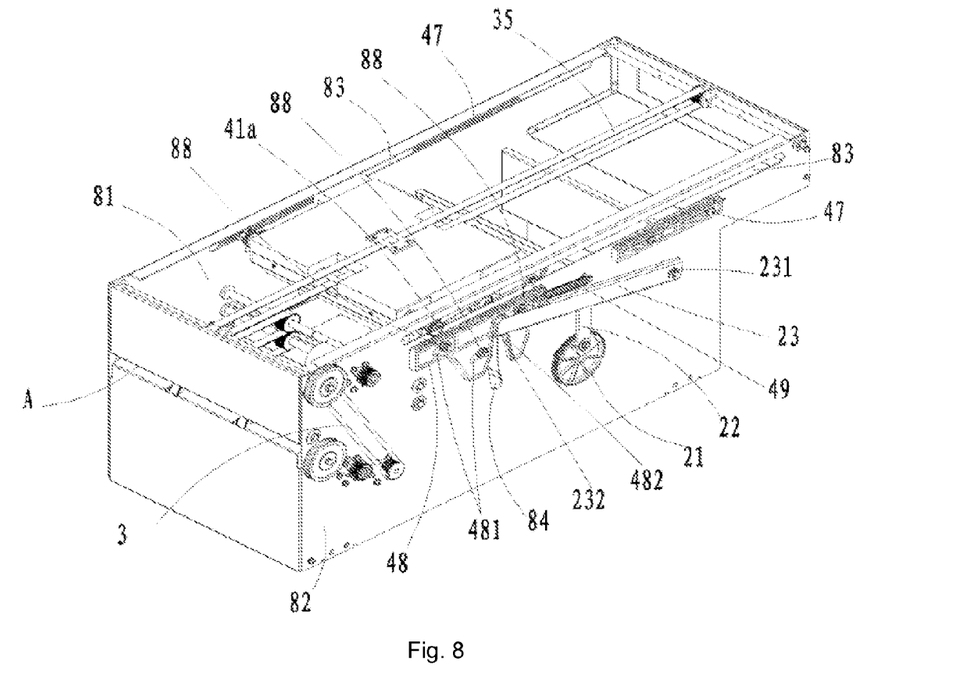
FIG. 8 is an isometric view of a sheet medium stacking conveying device provided by a second embodiment of the disclosure, wherein a pressing member of a switching mechanism locates at a swinging upper limit position.

FIG. 7 and FIG. 8 are isometric views of a sheet medium stacking conveying device provided by a second embodiment of the disclosure. Compared with the previous embodiment, a difference in the embodiment is that the sheet medium stacking conveying device further includes a recycling box (not shown in FIG. 7 and FIG. 8) arranged below the stacking mechanism 1 and used for recycling forgotten media; and the actuating mechanism further includes a second rack 48 and a second elastic element 49.

The second rack 48 is movably connected with the left side plate 81 or right side plate 82 of the frame, is located on the upstream of the first racks 47 and between the collection position and discharge position of the stacking mechanism 1 along the length direction of the moving passage, and has a set length. A driving groove 482 and at least two connecting holes 481 are provided in the second rack 48, wherein the second rack 48 is connected with a support shaft 88 arranged on the left side plate 81 or the right side plate 82 through the connecting hole 481 in the sleeving way, can move relative to the frame, and has an effective position and a failure position.

When the second rack 48 is at the effective position and when the stacking mechanism 1 moves along the first guide groove 83 in the frame, the second rack 48 can be engaged with the first branch gear 41a of the power input gear 41 of the actuating mechanism. When the second rack 48 is at the failure positions and when the stacking mechanism 1 moves along the first guide grooves 83 in the frame, the second rack 48 cannot be engaged with the power input gear 41 of the actuating mechanism. The driving groove 482 is an arc-shaped groove with an opening in one side, the opening is preferably trumpet-shaped, and the driving groove 482 is matched with the pressing part 232 of the switching mechanism 2 in the sleeving way.

One end of the second elastic element 49 is connected with the second rack 48, the other end of the second elastic element 49 is connected with the frame. Under the action of elasticity of the second elastic element 49, the second rack 48 always has a tendency of moving to the effective position.

When the pressing member 23 moves to the swinging lower limit position under the driving of the switching motor, the pressing part 232 of the pressing member 23 is separated from the driving groove 482 of the second rack 48, and the second rack 48 moves to the effective position under the action of the second elastic element 49, as shown in FIG. 7. When the pressing member 23 moves to the swinging upper limit position under the driving of the switching motor, the pressing part 232 of the pressing member 23 is matched with the driving groove 482 in the plugging way, and drives the second rack 48 to move to the effective position, as shown in FIG. 8.

A working process of the sheet medium stacking conveying device provided by the embodiment will be introduced below with reference to FIG. 7 and FIG. 8.

In an initial state, the stacking mechanism 1 is at the collection position, the pressing member 23 of the switching mechanism 2 is at the swinging lower limit position, that is, the lower stacking assembly 12 is opened relative to the upper stacking assembly 11, at this time, the second rack 48 of the actuating mechanism is at the effective position under the action of the second elastic elements 49, and is engaged with the first branch gear 41a of the power input gear 41 on the stacking mechanism 1; and after the collection of the media is finished, the switching motor of the switching mechanism 2 drives the pressing member 23 to move to the swinging upper limit position, and the lower stacking assembly 12 is closed relative to the upper stacking assembly 11.

At the moment, the second rack 48 of the actuating mechanism is at the failure position under the driving of the pressing part 232 of the pressing member 23, and is separated from the first branch gear 41a of the power input gear 41, the motor of the driving mechanism 3 rotates forwards to drive the second toothed belt 35 to drive the stacking mechanism 1 to move from the collection position to the discharge position; when the stacking mechanism 1 moves to the first rack 47, the first branch gear 41a of the power input gear 41 of the actuating mechanism is engaged with the first rack 47, thereby driving the first belt 113 and second belt 123 of the stacking mechanism to move to discharge the media between the first belt 113 and second belt 123 towards the medium outlet B; and when the stacking mechanism 1 moves to the discharge position, the first belt 113 and the second belt 123 clamp the tail ends of the stacked media for the user to take away.

If the media have not been taken away after a set time, the driving motor of the driving mechanism 3 rotates backwards to drive the second toothed belt 35 to drive the stacking mechanism 1 to move from the discharge position to the collection position towards the medium inlet A, and the first branch gear 41a of the power input gear 41 of the actuating mechanism is engaged with the first rack 47 to drive the first belt 113 and second belt 123 of the stacking mechanism 1 to move backwards to recycle the discharged media between the first belt 113 and the second belt 123.

When the stacking mechanism 1 moves to the second rack 48 along a recycling direction of the media, the switching motor of the switching mechanism 2 drives the pressing member 23 to move to the swinging lower limit position, and at this time, the pressing part 232 of the pressing member may not contact with the flange 124b of the second bracket 124 of the stacking mechanism 1. Therefore, the lower stacking assembly 12 of the stacking mechanism 1 is closed relative to the upper stacking assembly 11 under the action of the first elastic element 14, at the same time, the pressing part 232 of the pressing member 23 is separated from the driving groove 482 of the second rack 48, the second rack 48 moves to the effective position under the action of the second elastic element 49, and is engaged with the first branch gear 41a of the power input gear 41 on the stacking mechanism 1, and along with the continuous movement of the stacking mechanism 1 towards the medium inlet A, the second rack 48 drives the power input gear 41 to rotate to drive the first belt 113 and the second belt 123 to move backwards to discharge the media between the two belts towards the medium inlet A relative to the stacking mechanism 1, and when the stacking mechanism 1 moves to the recycling box, the media between the first belt 113 and the second belt 123 falls into the recycling box, and the recycle completes.

Furthermore, the sheet medium stacking conveying device provided by the embodiment can also realize failure recycling, and in case of a problem happened in a medium stacking process, the media which have been stacked in the medium collection space can be recycled.

Figure 9:
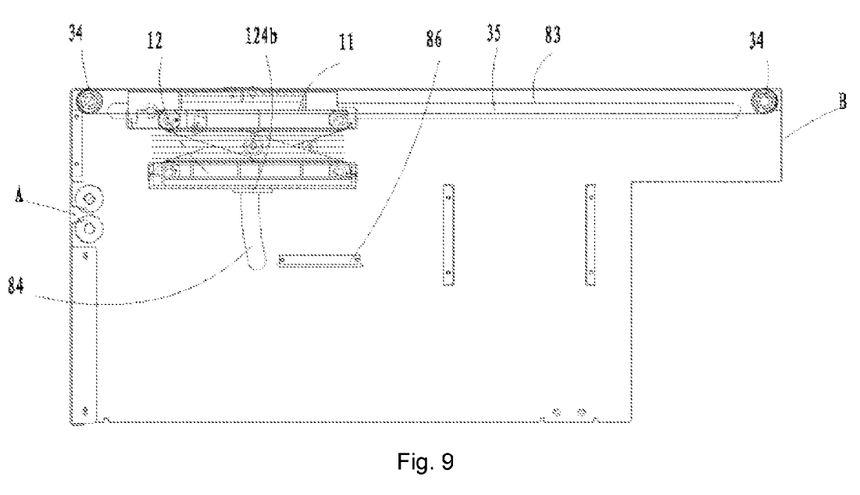
FIG. 9 is a section view of a sheet medium stacking conveying device provided by a second embodiment of the disclosure.

Specifically, as shown in FIG. 9, the frame further includes a limiting member 86, the limiting member 86 is fixedly connected with the left side plate 81 or the right side plate 82, a length direction of the limiting member 86 extends along the length direction of the moving passage, and the limiting member 86 is located on the downstream of the second guide grooves 84 along the length direction of the moving passage. When the stacking mechanism 1 is at the collection position and when the lower stacking assembly 12 is opened relative to the upper stacking assembly 11, the second rack 48 of the actuating mechanism is at the effective position under the action of the second elastic element 49, and is engaged with the power input gear 41 on the stacking mechanism 1, the stopping part 851 of the stopping plate 85 is spliced with the open groove 124a in the second bracket 124, and the media which have been stacked on the lower stacking assembly 12 are aligned along the stopping part 851 of the stopping plate 85.

When the sheet medium stacking conveying device fails, the control device of the sheet medium stacking conveying device controls the driving motor of the driving mechanism 3 to drive the second toothed belt 35 to drive the stacking mechanism 1 to move towards the medium outlet B, at this time, the flange 124b of the second bracket 124 contacts with the lower surface of the limiting member 86 after being separated from the pressing part 232 of the pressing member 23, the lower stacking assembly 12 is kept being opened relative to the upper stacking assembly 11 under the limitation of the limiting member 86, the second rack 48 drives the power input gear 41 to rotate so as to drive the first belt 113 and the second belt 123 to move towards the medium outlet B, and the media stacked on the lower stacking assembly 12 are blocked by the stopping part 851 of the stopping plate 85 to be separated from the medium collection space and fall into the recycling box.

The above is only the preferred embodiment of the disclosure and not intended to limit the disclosure, and for those skilled in the art, the disclosure can have various modifications and variations. Any modifications, equivalent replacements, improvements and the like within the spirit and principle of the disclosure shall fall within the scope of protection of the disclosure.

What is claimed is:

1. A sheet medium stacking conveying method, comprising a medium conveying step, wherein the medium conveying step comprises: moving a stacking mechanism for clamping media from a medium inlet to a medium outlet along a moving path, and discharging the media clamped by the stacking mechanism towards the medium outlet relative to the stacking mechanism in a process of moving the stacking mechanism towards the medium outlet, wherein at the same time of movement of the stacking mechanism, a first belt of an upper stacking assembly of the stacking mechanism and a second belt of a lower stacking assembly of the stacking mechanism are driven by the movement of the stacking mechanism to synchronously move so as to discharge the media located between the first belt and the second belt.

2. The sheet medium stacking conveying method according to claim 1, further comprising a medium recycling step, wherein the medium recycling step comprises discharging the media clamped by the stacking mechanism towards the medium inlet relative to the stacking mechanism in a process of moving the stacking mechanism from the medium outlet to the medium inlet.

3. The sheet medium stacking conveying method according to claim 1, further comprising a medium collection step before the medium conveying step, wherein the medium collection step comprises opening a lower stacking assembly of the stacking mechanism relative to an upper stacking assembly of the stacking mechanism to form a medium collection space, and closing the lower stacking assembly relative to the upper stacking assembly to clamp the media when the collection of the media is finished.

4. The sheet medium stacking conveying method according to claim 3, wherein the medium collection step further comprises an alignment step, and the alignment step comprises aligning front edges of the media conveyed from the medium inlet to the medium collection space along a conveying direction of the media in a process of opening the lower stacking assembly relative to the upper stacking assembly.

5. The sheet medium stacking conveying method according to claim 3, wherein the medium collection step further comprises a failure recycling step, and the failure recycling step comprises, when the media in the medium collection space need to be recycled, moving the stacking mechanism in a direction from the medium inlet to the medium outlet when the lower stacking assembly is opened relative to the upper stacking assembly, and simultaneously blocking the media so as to separate it from the medium collection space for recycling.

6. A sheet medium stacking conveying device, comprising a frame, and a stacking mechanism capable of clamping and conveying media, wherein the sheet medium stacking conveying device further comprises a driving mechanism for driving the stacking mechanism to reciprocally move along a moving path between a medium inlet and a medium outlet, and an actuating mechanism for discharging the media clamped by the stacking mechanism towards a direction of the medium outlet relative to the stacking mechanism, wherein the stacking mechanism comprises an upper stacking assembly and a lower stacking assembly movably connected with the upper stacking assembly, and wherein, at the same time of movement of the stacking mechanism, a first belt of the upper stacking assembly of the stacking mechanism and a second belt of the lower stacking assembly of the stacking mechanism are driven by the movement of the stacking mechanism to synchronously move so as to discharge the media located between the first belt and the second belt.

7. The sheet medium stacking conveying device according to claim 6, wherein the actuating mechanism comprises a first rack arranged on the moving path, and a power input gear arranged on the stacking mechanism; and the power input gear, in a process of moving the stacking mechanism towards a direction of the medium outlet, rolls relative to the first rack to discharge the media clamped by the stacking mechanism towards the direction of the medium outlet relative to the stacking mechanism.

8. The sheet medium stacking conveying device according to claim 7, wherein the stacking mechanism comprises first switching mechanism for opening the lower stacking assembly relative to the upper stacking assembly to form a medium collection space, and a first elastic element for closing the lower stacking assembly relative to the upper stacking assembly to clamp the media; each of the upper stacking assembly and the lower stacking assembly includes a belt conveying mechanism respectively; the belt conveying mechanism of the upper stacking assembly is in transmission connection with the power input gear; and the driving mechanism is in transmission connection with the upper stacking assembly.

9. The sheet medium stacking conveying device according to claim 8, wherein the stacking mechanism further comprises a guide assembly arranged on two sides of the upper stacking assembly and the lower stacking assembly respectively; the guide assembly comprises a first connecting rod and a second connecting rod; middle parts of the first connecting rod and the second connecting rod are pivoted; a first end of the first connecting rod is pivoted to the upper stacking assembly, and a second end of the first connecting rod is movably connected with the lower stacking assembly; and a first end of the second connecting rod is movably connected with the upper stacking assembly, and a second end of the second connecting rod is pivoted to the lower stacking assembly.

10. The sheet medium stacking conveying device according to claim 9, wherein a synchronous transmission mechanism is arranged between the belt conveying mechanism of the upper stacking assembly and the belt conveying mechanism of the lower stacking assembly; a groove extending along a rod length direction is formed in each of the first connecting rod and the second connecting rod respectively; and the synchronous transmission mechanism is located in the grooves of the first connecting rod and the second connecting rod.

11. The sheet medium stacking conveying device according to claim 8, further comprising a stopping plate arranged on the frame and located below the stacking mechanism, wherein the stopping plate is located in the medium collection space to align the collected media when the lower stacking assembly is opened relative to the upper stacking assembly.

12. The sheet medium stacking conveying device according to claim 8, wherein a flange is arranged on the lower stacking assembly, the first switching mechanism comprises a pressing member pivoted to the frame, and a driving parts for driving the pressing member to swing around its pivoting shaft, and a pressing part capable of pressing the flange is arranged on the pressing member.

13. The sheet medium stacking conveying device according to claim 11, further comprising a limiting member arranged on the frame, wherein, when the lower stacking assembly is opened relative to the upper stacking assembly and when the stacking mechanism moves in a direction from the medium inlet to the medium outlet, the limiting member keeps the lower stacking assembly continuously opened relative to the upper stacking assembly.

14. The sheet medium stacking conveying device according to claim 8, further comprising a second rack being position-switchable and arranged on the moving path, a second switching mechanism for switching the second rack from an effective position to a failure position, and a second elastic element for returning the second rack to the effective position, wherein, the power input gear rolls relative to the second rack at the effective position to discharge the media clamped by the stacking mechanism towards a direction of the medium inlet relative to the stacking mechanism in the process of moving the stacking mechanism towards the medium inlet.

15. The sheet medium stacking conveying device according to claim 14, wherein the second switching mechanism is the first switching mechanism, a driving groove is formed on the second rack, a flange is arranged on the lower stacking assembly, the first switching mechanism comprises a pressing member pivoted to the frame, and a driving part for driving the pressing member to swing around its pivoting shaft; a pressing part is arranged on the pressing member; wherein, the pressing part is spliced with the driving groove to drive the second rack to move to the failure position when the pressing member is at a swinging upper limit position, and the pressing part, when the pressing member is at a swinging lower limit position, is separated from the driving groove and matched with the flange in a pressing way, the second rack returns to the effective position.

16. The sheet medium stacking conveying device according to claim 8, wherein the frame comprises a left side plate and a right side plate, which are arranged in parallel at an interval, the stacking mechanism is located between the left side plate and the right side plate, a guide groove is formed in the left side plate and the right side plate respectively, a support roller matched with the guide groove in a plugging way is arranged on the two sides of the upper stacking assembly respectively, the first rack and the first switching mechanism are located on outer side(s) of the left side plate and/or the right side plate, and the power input gear extends out of the guide groove to be located on the outer side(s) of the left side plate and/or the right side plate.

17. The sheet medium stacking conveying device according to claim 8, wherein the driving mechanism is a conveying belt mechanism or a conveying chain mechanism.

* * * * *